United States Patent [19]

Feick et al.

[11] 3,911,316

[45] Oct. 7, 1975

[54] REHABILITATIONS TOOL FOR SERIOUSLY PHYSICALLY HANDICAPPED PERSONS INCLUDING MULTIPLEXED SERVO MECHANISMS

[75] Inventors: Eberhard Feick, Munich; Dieter Schmettow, Erlangen, both of Germany

[73] Assignee: C. Stiefenhofer, KG, Munich, Germany

[22] Filed: Jan. 31, 1974

[21] Appl. No.: 438,401

[30] Foreign Application Priority Data

Feb. 2, 1973 Germany............................ 2305208

[52] U.S. Cl. ................ 318/562; 318/102; 340/166; 318/103
[51] Int. Cl.² ......................................... G05B 11/32
[58] Field of Search.................... 318/102, 103, 562; 340/166

[56] References Cited
UNITED STATES PATENTS

| | | | |
|---|---|---|---|
| 2,883,597 | 4/1959 | Eck..................................... | 318/103 |
| 3,422,329 | 1/1969 | Anderson et al. .................. | 318/103 |
| 3,426,259 | 2/1969 | Ziehm................................ | 318/102 |
| 3,792,332 | 2/1974 | Fuller................................. | 318/103 |

FOREIGN PATENTS OR APPLICATIONS

1,021,531   3/1966   United Kingdom

Primary Examiner—T. E. Lynch
Attorney, Agent, or Firm—Charles W. Helzer

[57] ABSTRACT

Rehabilitation apparatus controllable by a seriously physically handicapped person comprises an input switch actuable by that person with a mechanical, pneumatic, or acoustic activity, to operate a pulse generator during the period of actuation of the switch. The pulse generator operates a selector in stepped manner, and the selector outputs are each applied to a respective logic gate which operates to activate a respective servo device only when the relevant selector output is extant and the input switch actuation is terminated. The control activity required from the handicapped person to selectively activate any one of a plurality of servo devices is accordingly reduced to an effective minimum. For larger numbers of servo devices, selection matrix techniques are employed with two or more selectors which can be stepped by sequential actuation of a single input switch, or by respective input switches, dependent on the capability of the handicapped person. Indications are provided to denote when respective servo devices are selectable during the stepping, and resetting of the selectors is automatic after each servo selection.

12 Claims, 8 Drawing Figures

| | 2 | 3 | 4 | 5 | 6 | 7 | 8 | 9 | 10 |
|---|---|---|---|---|---|---|---|---|---|
| | VL | A | EA | S1 | S2 | S3 | S1 | S2 | S3 |
| | ST | W | | EA | LA LE | HZ | RL | EA | LA LE |
| | RL | LA LE | | | | RU | LS | V | Z |
| | B6 | J2 | O□ | ⊚ | | | GU | ET | LA LE |
| | A. | F4 | P9 | X: | < | | | 1 | 2 |
| | H. | C8 | K( | ≡ | Y5 | V− | | 3 | 4 |
| | I | O | 1... | L) | W3 | Z | | 5 | 6 |
| | E− | A... | T. | G0 | M7 | U¡ | | 7 | 8 |
| | ZWR | N, | R/ | S‰ | 0% | | | 9 | 0 |

REHABILITATIONS TOOL FOR SERIOUSLY PHYSICALLY HANDICAPPED PERSONS INCLUDING MULTIPLEXED SERVO MECHANISMS

BACKGROUND OF INVENTION

1. Field of Invention

This invention relates to rehabilitation equipment for seriously physically handicapped persons to allow such handicapped persons to carry out control operations normally beyond their abilities.

2. Background Problem

There are more than 10,000 seriously physically handicapped persons in the Federal Republic of Germany alone, which persons are, for example, paralyzed as a result of accidents, are given artificial respiration by means of iron lungs, are blinded, or were born with a serious physical handicap. Many of these persons can only carry out a restricted number of movements or general activity functions. Such persons, who normally require the help of a nurse, should nevertheless be given the possibility of being able to carry out for themselves certain operations of their daily needs and, moreover, to follow a vocational activity to a certain extent.

Equipment which permits a seriously physically handicapped person to carry out such operations should, as far as possible, have the following properties:

1. Every mentally normally fit seriously physically handicapped person should be able to operate the equipment independently of the type of handicap and the degree of handicap.

2. The adaptation to the special capabilities of the individual physically handicapped persons should be possible with the lowest expenditure.

3. The learning which is necessary before the physically handicapped person can operate the equipment must be as small as possible.

4. The operation of the equipment should tax the physically handicapped person as little as possible, and 5. The equipment should make available as large a number of vocational and extravocational activities as possible.

SUMMARY OF INVENTION

These requirements can be largely or wholly met by the provision of apparatus which comprises: a single input switch, which can be actuated by the seriously physically handicapped person during a selectable time; a pulse generator, the pulses of which produced during the actuation time of the first input switch are fed to a first selector which is sequenced through a plurality of conditions thereby in a stepwise manner; a plurality of servo devices respectively connected by means of individual logic gates with outputs of the selector corresponding to said conditions, which servo devices execute predetermined operations; and by a control device for producing a signal which can be applied to each of said logic gates, which control device is operable upon termination of said input switch actuation to activate a selected one of said logic gates connected with the corresponding output of said selector.

Such equipment has a considerable number of advantages. Thus, to execute the different operations only a single input switch need be provided. This input switch can be adapted to the special capability of the physically handicapped person. Thus, the switch can be actuated mechanically if the physically handicapped person can produce an input signal by way of a finger, a toe or an arm stump, for example. On the other hand, the input switch can also be so constructed that it responds pneumatically to blowing or sucking by the physically handicapped person, or acoustically by the production of sound by the person. The equipment is thus usable for all types of physically handicapped persons independently of the capability for a certain body function.

Furthermore, the learning expenditure is extremely low. Since the signal parameter is the time during which a physical value must be maintained, the physically handicapped person only needs to fix the start and the end of the actuation of the input switch in order to be able to trigger and terminate the desired operation. The speed of the triggering process is determined by the frequency of the pulse sequence and the pulse generator is, therefore, preferably so constructed that its frequency is variable. The actuation of the apparatus, therefore, only requires a basic sense of rhythm and a reaction ability to which the equipment can be adapted.

The number of servo devices controllable in this manner can be increased at will and the servo devices associated with the individual operations can be interchangeable so that the apparatus is not restricted to the execution of certain operations. The apparatus itself requires, in spite of its manifold applicability and adaptation to the most varied operations to be executed, only an extremely low coding expenditure.

The setting up of the apparatus is not restricted as to location, since the control equipment in the form of the input switch can be connected to the actual control equipment by feed lines which can be of any length, or even by remote control. The apparatus itself places a low demand both psychologically and physically on the handicapped person, and the actuation of the equipment can be performed by him in any body position whatever.

Preferably, an indicator device is associated with each output of the selector, which device is actuable in dependence of the appropriate condition of the selector. Appropriately, in this case, the indicator devices are of visual form arranged in a row so that when the input switch is actuated the indication obtained at these indicator devices corresponding to the conditions of the selector runs progressively along the row.

Preferably, the apparatus further comprises: a second selector with a plurality of outputs which are respectively connected with individual outputs of the first selector to form inputs of associated logic gates serving to control servo devices, and a switch-over device operable during successive actuations of said input switch, in dependence on its switch state to apply the pulse generator output to the first or the second selector; said control device producing its signal to activate said gates only in response to termination of said successive actuations. Such a form of apparatus makes possible, in the case of a plurality of servo devices to be triggered, a reduction of the operating time, the indicator devices associated with the servo devices to be triggered being arranged in the form of a matrix, of which discrete locations are respectively associated with different combinations of condtions of the two selectors.

In a modification of this last form of the invention, two input switches are provided for respective operation of the two selectors. Such a modification equipment is suited to a handicapped person who can effect two input signals at the same time, such as with a finger and a toe, for example. In any event, the working speed of the equipment can be substantially increased.

In a preferred modification, a change-over switch is provided whereby the apparatus can be switched over from a parallel operation with two input switches to two-stage serial operation with only one input switch.

If more than about 125 activities are to be selectable then an arrangement has proved appropriate which involves a first input switch actuable during a selectable time by the handicapped person, which switch is in connection with a third selector stepped thereby and has outputs associated with each condition thereof, such outputs being connected with fourth selectors and fourth logic gates. These gates apply pulses from a pulse generator during the actuation time of the first input switch to the fourth selector corresponding to the condition of the third selector, and also to step the fourth selectors in sequence. These fourth selectors have conditions and are associated with further logic gates, through which respective servo devices are actuated, in similar manner to the aforementioned first and second selectors when all of the fourth selectors have been operated and the input switch actuation has terminated. In this case, the indicators and associated servo devices to be controlled can be arranged in a plurality of separately controlled matrices, whereby a greater functional clarity and operating speed can be attained.

A further feature applicable to each of the above-discussed forms of apparatus involves the provision of a selector reset device actuable by the control device signal.

All of the control operations executed by the apparatus of the invention can be relatively simple and are suited to use of electrical signals to control such equipment as vehicles, computers, typewriters, telephones, tape recorders, devices for turning over book pages, radios, televsions, and so on.

BRIEF DESCRIPTION OF DRAWINGS

The invention will be described in greater detail in the following by reference to presently preferred exemplary embodiments shown in the accompanying drawings, in which.

DETAILED DESCRIPTION OF PREFERRED EMBODIMENTS

Figure 1:
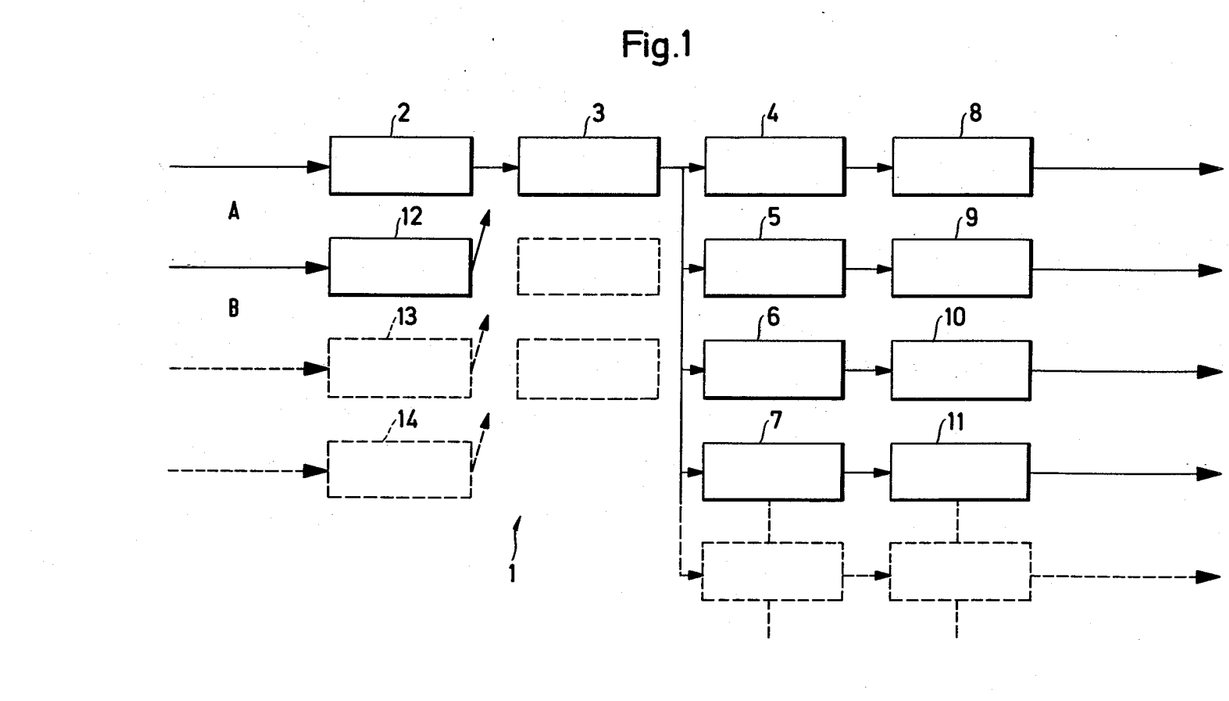
FIG. 1 illustrates in block schematic manner an entire apparatus in accordane with the invention.

FIG. 1 schematically shows the general construction of apparatus constructed in accordance with the invention. In the apparatus, which is given the general reference number 1, a signal A produced by the handicapped person is fed to order equipment 2, the output of which is connected to the input of control equipment 3. Different servo equipments 4 to 7 are triggerable by the output of the control equipment 3, which servo equipments respectively activate execution equipments 8 to 11 in such a manner that any activated execution equipment performs a desired single operation. An execution equipment can comprise a light switch which can be switched on or off, for example, or any other similarly operable equipment. Further order equipments 12 to 14 can be connected to the input of the control equipment 3, which order equipments are respectively actuable by different physically handicapped persons.

Figure 2:
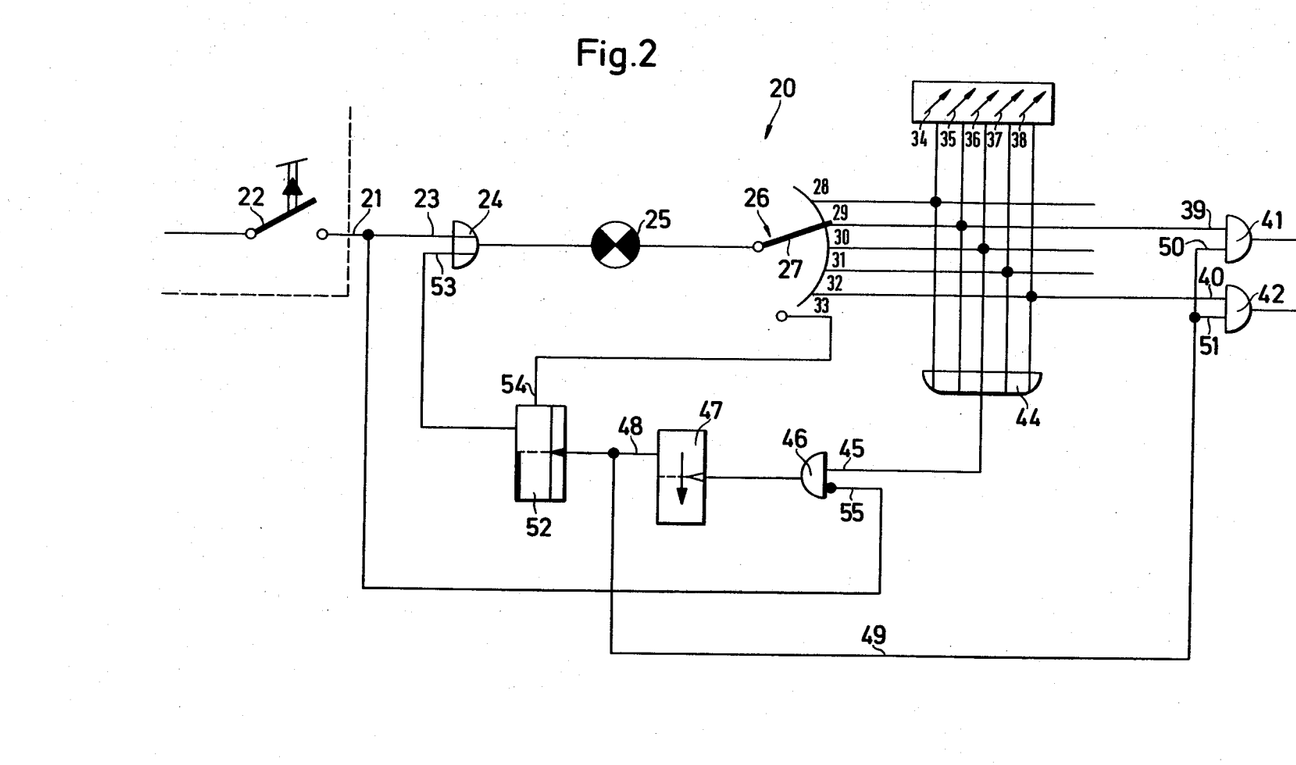
FIG. 2 shows a logic circuit diagram of a first form of the apparatus in accordance with the invention.

FIG. 2 shows the logic circuit diagram of a first form of control equipment which is suitable for use as the eqipment 3 in the system shown in FIG. 1 and is given the general reference 20. A switch 22, which is actuable by the physically handicapped person, is connected as the order device to the input 21 of this control equipment 20. The switch 22 can be constructed so that it closes in response to a mechanical signal, as by a pressure or traction from the operator, a pneumatic signal as by the operator blowing or sucking, by an acoustic signal of predetermined strength or frequency emitted by the operator through use of whistles having different and readily distinguished tones, an electronic audible signal generator, light beams, or in any other suitable way.

The input 21 is connected to the first input 23 of an OR-gate 24. The output of the OR-gate 24 is connected to a first selector switch 26 by way of a pulse generator 25 in the form of a periodic signal-interrupting device 25. This selector switch 26 has a number of outputs 28 to 33 which corresponds to the number of switch positions through which its switch arm 27 can be seequenced, and the output 33 corresponds to the initial position of the switch arm 27. Of course the selector switch 26 need not be of a mechanical operable form, as is shown, but can comprise any suitable kind of selector, such as of electro-magnetically, electronically, or optically operable form. The outputs 28 to 32 of the selector switch 26 are respectively connected to separate indicators 34 to 38 which each provide an indication when the switch arm 27 is in the switch position corresponding to the associated output.

Also, each of the selector switch outputs 28 to 32 is connected to a first input of a respective output AND-gate. For the sake of clarity, only two such first inputs 39 and 40 of respective output AND-gates 41 and 42 connected to the outputs 29 and 32, are shown. The outputs of these AND-gates lead to respective servo devices which are not shown in FIG. 2.

In addition, the selector swtich outputs 28 and 32 are respectively connected to corresponding inputs of OR-gate 44. The output of the OR-gate 44 is connected to a first input 45 of a further AND-gate 46 to which the input 21 also is connected in an inverse manner. The output of the AND-gate 46 is connected to the input of a monostable multivibrator 47. The output 48 of the monostable multivibrator 47 is connected to a line 49 which is connected in parallel to second inputs of all of the AND-gates of which 41 and 43 are examples, these last two gates having second inputs 50 and 51. The output 48 also is connected to the set input of a bistable multivibrator 52. The output of the bistable multivibrator 52 is connected to a second input 53 of the OR-gate 23, whereas its reset input is connected to the output 33 of the initial or starting position of the selector 26. Finally, the input 21 of the control equipment 20 is additionally connected to a second, inverse input 55 of the AND-gate 46.

The mode of operation of this control equipment is as follows:

In the starting position the selector switch 26 is in its initial starting position 33 so that none of the indicators 34 to 38 is activated. Closure of the switch 22 causes a continous signal to be fed, by way of the input 21 and the OR-gate 24, to the interrupter 25 which converts the continuous signal to a pulse train signal of which each pulse steps the selector switch 26 on by one position. Thus, the number of steps the selector switch 26 is operated depends on the period of actuation of the switch 22 and on how many pulses the periodic interrupter 25 produces during this time. When the switch 22 is opened again, the production of pulses by the periodic interrupter 25 terminates and the selector switch 26 remains in the switch position reached at that time. This switch position is indicated by the asociated one of the indicators 34 to 38 and, in this connection, it should be noted that this indication can comprise, for example, both a light signal and a digital indication, and/or an audible signal such as a buzzing tone of distinctive pitch. Furthermore, the selector switch 26 can be arranged to produce an audible signal such as a click with each switch step so that the switch position can be determined by the number of the clicks which have occurred since closing the swtich 22. In any event, according to the position of the selector switch 26 a signal occurs at one of the first inputs of the AND-gates including gates 41 and 42, and in the illustrated situation it is the first input 39. Furthermore, since the selector switch 26 is located in a switch position other than the initial position 33, a signal is fed by way of the OR-gate 44 to the first input 45 of the AND-gate 46. However, there is no active signal at the second, inverse input 55 of this AND-gate when the switch 22 is closed, and in this way the AND-gate 46 accordingly remains closed during the period of actuation of the switch 22. When the switch 22 is opened to terminate an actuation period, the AND-gate 46 applies a pulse to the monostable multivibrator 47 which, in turn, produce a pulse at its output 48. This pulse is fed by line 49 to all second inputs of the AND-gates including gates 41 and 42. However, only the one of these AND-gates which is already activated at its first input from the selector switch 26 is opened. In the illustrated situation, this applies to AND-gate 41. Thus, an enabling signal is fed to the relevant servo equipment by means of AND-gate 41, which equipment then executes the desired operation.

The output signal at 48 of the monostable multivibrator 47 is simultaneously fed to the bistable multivibrator 52 from which the resultant output is fed by way of the OR-gate 24 to the periodic interrupter 25 which, in turn, produces pulses to step the selector switch 26 until it has returned to its initial position. When this position is reached, a pulse is fed from the output 33 to the reset input 54 of the bistable multivibrator 52 and the multivibrator output is terminated. Thus, the control device 20 is returned to its initial conditon and is ready for further control procedure operation. Usually, the indicators such as 34 to 38 will be arranged in a row through which the indication signal is sequenced during an actuation period of the switch 22. In order to optimize use of the control equipment, it is desirable that the more frequently activated servo equipment be associated with outputs of the selector switch which are closer to the initial starting position and initial state of the selector and an advantage of the control equipment just described consists in the fact that the servo equipments to be triggered can be connected to the selector switch outputs in any desired sequence. The servo equipments to be controlled are thus exchangeable and interchangeable at will. The only associated requirement is for a change in the indicator and in the indicator sequence and this can be easily realized in the case of an illustrated symbol indication in that only symbolic images are changed.

Because of the average time required to activate servo equipment with control equipment of the form just described, it will normally be appropriate to control only up to about 25 pieces of servo equipment. If more than 25 pieces of servo equipment have to be controlled, then preferably a control equipment arrangement of the form shown by FIG. 3 is employed.

Figure 3:
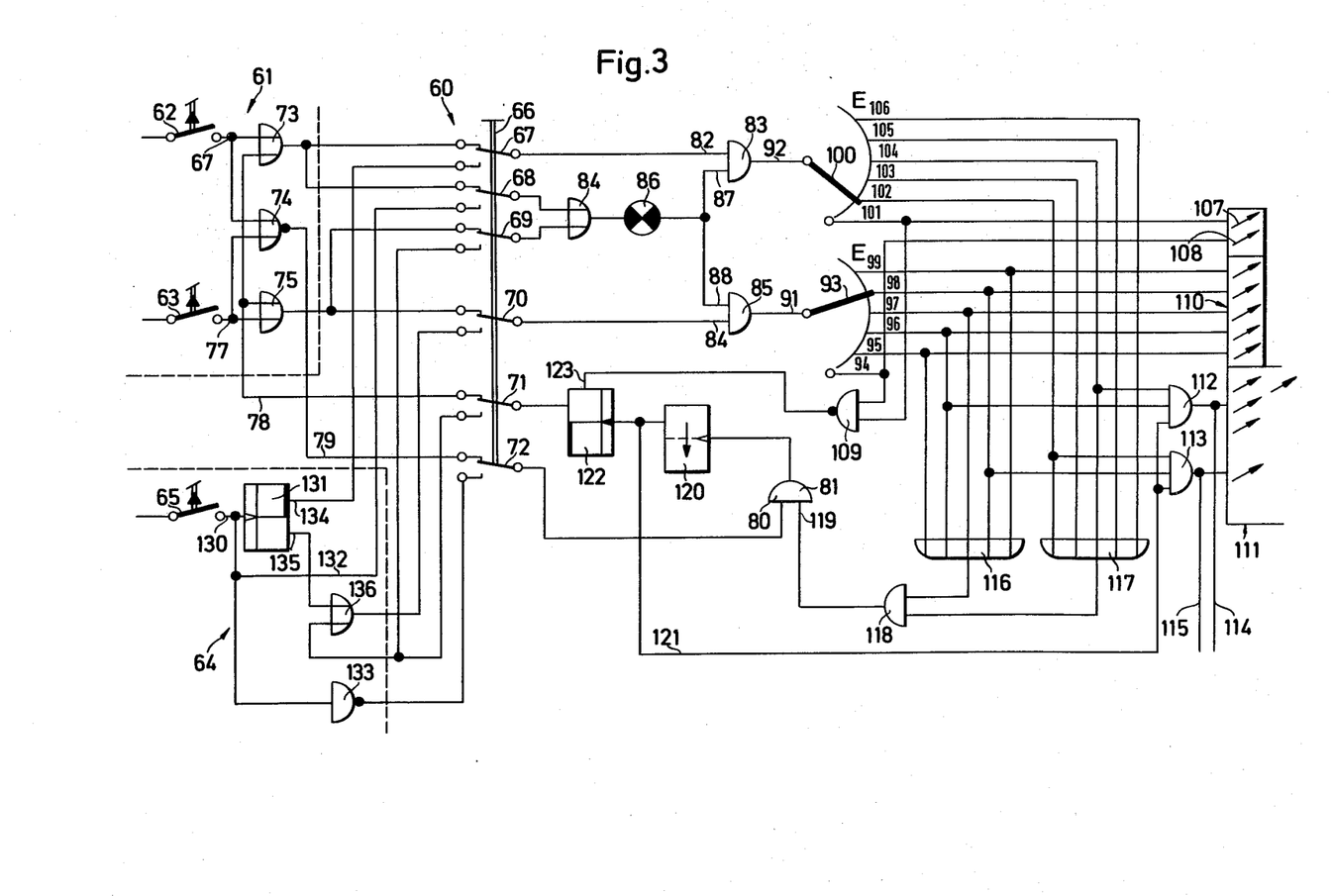
FIG. 3 shows a logic circuit diagram of a second form of apparatus in accordance with the invention.

FIG. 3 shows control equipment denoted generally by reference numeral 60 which equipment is actuable on the one hand by order equipment 61 including two switches 62 and 63 actuable in parallel manner and, on the other hand, by order equipment 64 including only one switch 65 operated in serial manner. Switchover between the order equipments 61 and 64 is effected by use of a change-over switch 66.

First, the operation of the control equipment by use of the order equipment 61 will be explained. The output 76 of the switch 62 is connected in parallel to a first input of each of two OR-gates 73 and 74, where the OR-gate 74 has an inverse output. The output 77 of the switch 63 is connected in parallel to a first input of an OR-gate 75 and a second input of OR-gate 74. The output of the OR-gate 74 is connected to a first input 80 of an AND-gate 81 by way of a line 79 and a switchover contact 72. The output of the OR-gate 73 is connected in parallel by way of respective switch-over contacts 67 and 68, to a first input 82 of an AND-gate 83, and to a first input of an OR-gate 84. The output of the OR-gate 75 is connected by way of a switch-over contact 70 to the first input 84 of an AND-gate 85 and, in parallel, by way of a switch-over contact 69 to a second input of the OR-gate 84. The output of the OR-gate 84 is connected, by way of a periodic interrupter 86, in parallel to the respective second inputs 87 and 88 of the AND-gates 83 and 85.

The output of the AND-gate 85 is connected to a first selector switch 91, and the output of the AND-gate 83 is connected to a second selector switch 92. The first selector 91 has outputs 94 to 99, respectively, associated with the successive switch position of its selector arm 93, and the second selector 92 has outputs 101 to 106 similarly associated with the switch positions of its selector arm 100. The respective initial starting positions 94 and 101 of the selectors 91 and 92 are connected to individual indicators 107 and 108, and also to respective ones of two inputs of an inverse AND-gate 109 which has an inverse output. The reamining outputs 95 to 99 of the first selector 91 are respectively connected to successive indicators of a row 110 which forms a first column of a rectangular matrix of indicators 111. In addition, the outputs of the first selector 91 are individually connected, together with individual outputs of the second selector 92, to the inputs of a plurality of AND-gates 112, 113, etc., there being sufficient of these AND-gates for each of the possible combinations of two such outputs of the first and second selectors 91 and 92. For the sake of clarity, only the two AND-gates 112 and 113 are shown for examples of these AND-gates. The outputs of these AND-gates are connected to respective indicators in the matrix 111 and also to a respective servo device. Output lines 114 and 115, lead to servo equipment (not shown) respectively associated with the AND-gates 112 and 113.

All of the outputs of the first selector 91 with the exception of the output 94 for the initial position are connected to an OR-gate 116, and the corresponding outputs of the second selector 92 to an OR-gate 117. The outputs of the two OR-gates serve as the two inputs of an AND-gate 118. The output of the AND-gate 118 forms the second input 119 of the AND-gate 81 which, recall, has its first input connected through conductor 79 to the inverse output of OR-gate 74. The output of the AND-gate 81 is connected to the input of a monostable multivibrator 120. The output of this multivibrator is, on the one hand, connected by way of the line 121 with respective third inputs of each of the AND-gates including 112 and 113 and, on the other hand, to the input of a bistable multivibrator 122. The 'O' output of the bistable multivibrator 122 is connected by means of a switch-over contact 71 and a line 78 with respective further inputs of the OR-gates 73 and 75. furthermore, a line leads from the inverse output of the AND-gate 109 to the reset input 123 of the bistable multivibrator 122.

Regarding the periodic interrupter 86, it should be further noted that the latter can comprise any type of interrupter whatever, or by any suitable form of pulse generator, which is activated by a signal at its input and operates only while such a signal is present.

The mode of operating this arrangement which is suitable particularly for use in the case of seriously physically handicapped persons who can execute two swtich functions at the same time, is as follows:

With the actuation of at least one of the two switches 62 and 63 a signl is fed through the OR-gate 73 or 75, the switch-over contacts 68 or 69, and the OR-gate 84, to the periodic interrupter 86 which, as long as this signal is applied thereto, emits periodic pulses to the inputs 87 and 88 of the AND-gates 83 and 85. These pulses, however, are only let through the relevant AND-gates if the switch 62 or 63 is actuated sufficiently to apply a corresponding signal simultaneously through switch-over contact 67 or 70 to the input 82 or 84 of the AND-gate 83 or 85. Pulses from these AND-gates respectively step the selectors 91 and 92 during the period for which the relevant switch 62 or 63 remains closed, so that either selector can be operated to a desired condition. A different indicator in the indicator matrix 111 is uniquely associated with each combination of switch positions of the selectors 91 and 92 after actuation of the two switches 62 and 63, and the AND-gates including 112 and 113 are similarly associated with the selectors. For example, as shown in FIG. 3, the selector arm 93 of the first selector 91 is connected to the output 98, the selector arm 100 of the second gate 92 to the output 102, and the AND-gate 113 is uniquely associated with these two outputs so that, under these conditions, input signals are applied at two of its three inputs.

Since, under these same conditions, neither of the two selector arms 93 and 100 is in its initial position 94 or 101, respective input signals are applied to the AND-gate 118 through the OR-gates 116 and 117 so that a corresponding signal is fed to the second input 119 of the AND-gate 81. There is no signal at the first input 80 of this AND-gate 81 as long as at least one of the two switches 62 and 63 is closed, because of the inverse nature of the output of the OR-gate 74. Such a signal appears only if both switches 62 and 63 are open accordingly the AND-gate 81 is opened. Hence, upon discontinuing stepping of switches 93 and 100 and opening of switches 62 and 63, a signal is fed to the input of the monostable multivibrator 120. The pulse produced by this is fed through the line 121 to the third inputs of each of the AND-gates including 112 and 113. However, only AND-gate 113 has signals applied simultaneously to all of its three inputs, so that a signal is fed to the associated servo equipment from the output of this AND-gate 113 on the line 115. At the same time the bistable multivibrator 122 is set by the pulse output from the monostable multivibrator 120 so that a signal is fed by way of the switch-over contact 71, to the OR-gates 73 and 75, from which the signal continues, on the one hand, through switch-over contacts 66 and 70 to inputs 82 and 84 of AND-gates 83 and 85, and, on the other hand, through switch-over contacts 68 and 69, and OR-gate 84, to the interrupter 86 which applies pulses to inputs 87 and 88 of the AND-gates 83 and 85. The AND-gates 83 and 85 accordingly apply pulsed outputs to step the selectors 91 and 93 to their initial starting positions. When these positions are reached, signals are applied to the inputs of the AND-gate 109 so that the bistable multivibrator 122 is reset to its initial condition and its output through its reset signal is terminated. The control equipment is then inl its initial position again so that a further control process can be initiated.

The arrangement shown in FIG. 3 can be switched over from a parallel operation to a series operation by operating the change-over switch 66. In this case, the output 130 of the switch 65 is connected in parallel to the input of a bistable multivibrator 131, by a line 132 to the switch-over contact 68, and to the input of an inverter 133. The bistable multivibrator 131 has a first, initial or reset output 134 connected to the switch-over contact 67, and a second, set output 135 connected through an OR-gate 136 to the switch-over contact 70. A second input of the OR-gate 136 is connected both to the switch-over contact 71 and to the switch-over contact 69. The output of the inverter 133 is connected to the switch-over contact 72.

The mode of operation of this arrangement is such that, when the switch 65 is closed, a signal is fed through the line 132 to the periodic interrupter 86 so that pulses are applied through the AND-gate 83 to the second selector 92, the AND-gate 83 simultaneously receiving a signal from the first output of the bistable multivibrator 131. At this time, the AND-gate 85 is closed. Thus, only the selector 92 is stepped by a first actuation of the switch 65. At the end of this first actuation of the switch 65, the bistable multivibrator 131 is set by the trailing edge of the terminal signal pulse produced by opening of swtich 65, so that the AND-gate 85 is biased or opened to pass pulse signals and the AND-gate 83 is closed. Then, when the switch 65 is actuated a second time, the pulses produced by the interrupter 86 are fed to the first sleector 91 through the AND-gate 85, and when the switch 65 is opened again, the bistable multivibrator 131 is reset to its initial state. Thus, as in the case of the paralled operation, a predetermined AND-gate such as 113 is selectively opened by sequential operation of the two selectors 91 and 92. This AND-gate applies an activating signal to its associated servo equipment when the switch 65 is opened a second time since a signal is then present at the output of the inverter 133, and thus at the input 80 of the AND-gate 81, simultaneously with an output from AND-gate 118, which applies an enabling signal at the input 119 of AND-gate 81. AND-gate 81 then operates multivibrator 120 to apply a signal to the third input of the servo equipment AND-gates such as 113 in the previously described manner.

Resetting of the selectors is also effected with the operation of multivibrator 122 to apply a signal through the switch-over contact 71, the OR-gate 136, to the switch-over contact 70, and at the same time to the switch-over contact 69. Thus, the interrupter 86 is actuated in conjunction with the signal present at the reset output 134 of the bistable multivibrator 131, and the AND-gates 83 and 85 are both open. The other remaining part of the equipment resetting operation corresponds to that described above for the case of parallel operation.

Should more than about 125 pieces of servo equipment have to be selectively controlled, then the respective indicators are preferably not all combined into a single matrix. This would probably reduce the functional clarity of the equipment to a user to the extent that the average time of access to a desired piece of servo equipment would be reduced. In these circumstances, it is preferable to divide the servo devices to be controlled between several indicator matrices which are located above or next to each other. Then it is possible for a desired indicator matrix to be selected with a first circuit and a desired location in that matrix to be selected by two further switch actuations.

Figure 4:
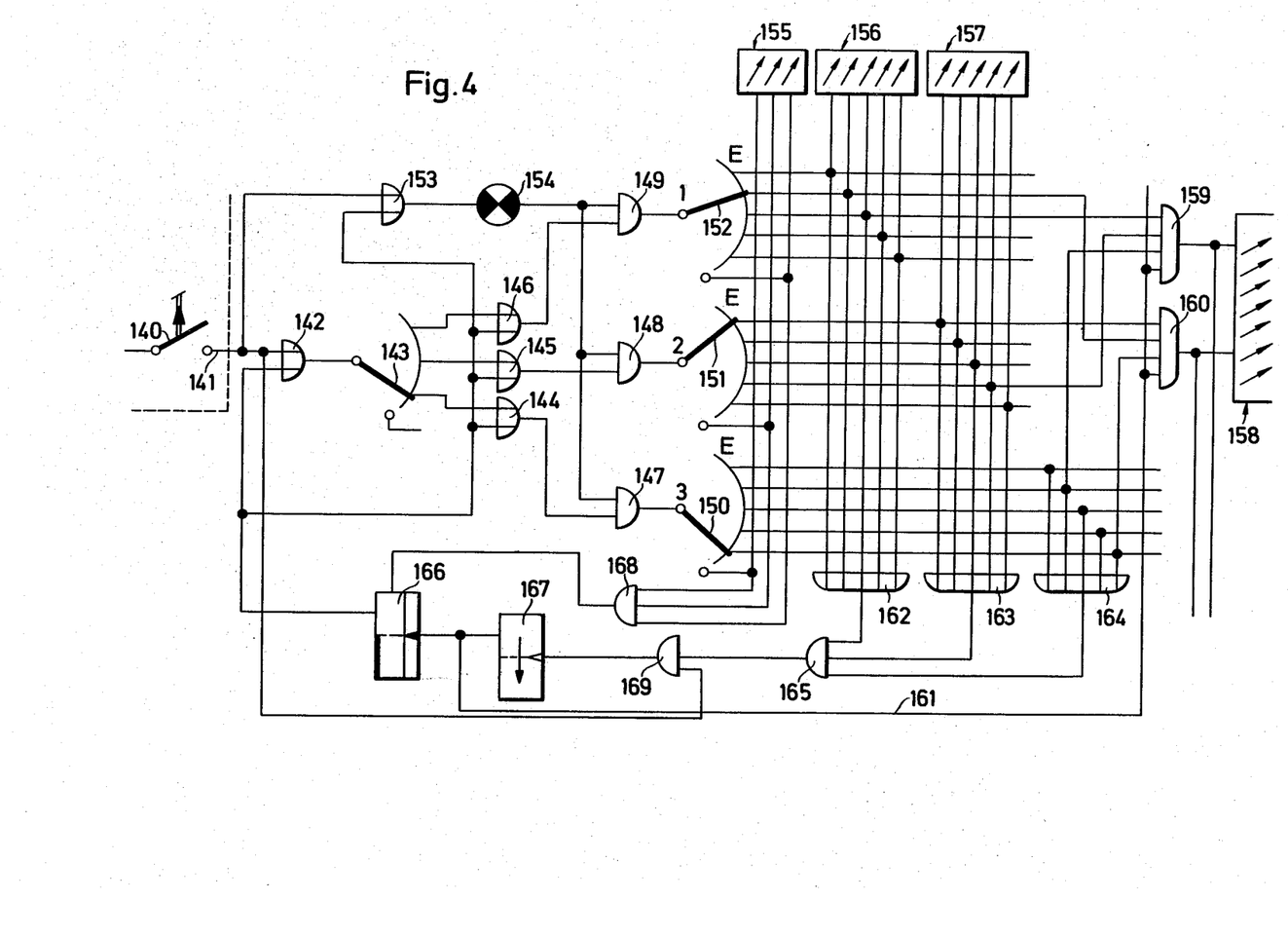
FIG. 4 shows a logic circuit diagram of a further form of apparatus in accordance with the invention.

FIG. 4 shows an arrangement with which such an operation can be effected. Since the mode of operation corresponds in principle to the mode of operation of the arrangements shown in FIGS. 2 and 3, the description of this arrangement can be made relatively short. A third selector 143 with three outputs and an initial position has its stepping input connected through an OR-gate 142 to the output 141 of a switch 140 which can be actuated by the physically handicapped person. The outputs of this third selector are respectively connected through OR-gates 144 to 146 to second inputs of AND-gates 147 to 149. The outputs of these AND-gates are respectively connected with fourth selectors 150 to 152. The switch output 141 is further connected through an OR-gate 153 to a periodic interrupter 154, the output of which is respectively connected at first inputs of the AND-gates 147 to 149.

The initial positions of the three fourth selectors 150 to 152 are associated with a common set of indicators 155. The outputs of the selector 152 respectively serve to operate indicators in a matrix associated with another set of indicators 156 showing that the relevant matrix has just been selected. A similar set of indicators 157 is associated with all outputs of the fourth selector 151. Such sets of indicators as 156 and 157 can be provided in respective association with a plurality of matrices and correspond to the indicator column 110 in FIG. 3. For the sake of clarity only one matrix 150 is partly shown. For each matrix location a unique AND-gate such as 159 and 160 has inputs connected to the respective combination of outputs of the fourth selectors 150 to 152. Also, an additional input for each of these AND-gates is connected through a common line 161 to the output of a monostable multivibrator 167. In addition, an OR-gate 162 to 164, the outputs of which form inputs of an AND-gate 165, have their inputs connected to the outputs of the fourth selectors 150 to 152 with the exception of the initial position. The output of the AND-gate 165 is connected to a first input of an AND-gate 169, the second input of which is connected to the output 141 of the switch 140. The output of the AND-gate 169 is connected to the input of the monostable multivibrator 166, 167 which in turn is connected to the input of a bistable multivibrator 166. The output of bistable multivibrator 166 is connected in parallel to an input of the OR-gate 142 and to one input of each of the OR-gates 144 to 146. The initial positions of the selectors 150 to 152 are connected to the reset input of the multivibrator 166 by means of an AND-gate 168.

In operation of this arrangement, initial actuation of the switch 140 causes pulses to be applied by the periodic interrupter 154, to the AND-gates 147 to 149. The pulses are passed to one of the selectors 150 to 152 associated with one of the AND-gates 147 to 149 which has just been connected to an acitve output of the third selector 143. Thus, initial actuation of switch 140 steps the selector 143 to its first output and so opens AND-gate 147 to selector 150, the next actuation of switch 140 steps the selector 143 to activate selector 151 by opening AND-gate 148, and so on. Also, the duration of the actuations of switch 140 determines the positions of the selectors 150 to 152. Accordingly, after a threefold actuation of the switch 140, all three fourth selectors 150 to 152 are set into the desired position, whereby a certain AND-gate such as 159 or 160 is opened. As shown, the selected AND-gate 160 is opened and passes the output then produced by the monostable multivibrator 167 which is activated by way of OR-gates 162 to 164, AND-gate 165, and AND-gate 169. This activation also causes resetting of the third selector 143 and the fourth selectors 147 to 149 to their initial positions by triggering the bistable multivibrator 166. When all four selectors 150 to 152 are reset into their initial positions, the multivibrator 166 is reset by means of the AND-gate 168. The overall operating procedure can then be repeated to activate another piece of servo equipment.

In all of the arrangements as thus far described, it is not absolutely necessary that the appropriate selectors are reset automatically into their initial positions at the end of the operating procedure. If desired, a suitable dwell time can be provided between the actuation of a selector and its automatic resetting. This could be achieved by inserting a second operator controlled order equipment in the connection between the output of the bistable multivibrator 52 and the input to OR-gate 24 of the control equipment shown in FIG. 2, for example. Further, as an alternative, a procedure can be provided in which each selector begins to step on from its previously selected position. However, resetting is appropriate so that selection of the next piece of servo equipment can be begun from a common starting condition. Binary counters have proved particularly suitable as selectors for this purpose with such counters being connected to decoders for conversion into a decimal output.

If equipment is desired of the form shown in FIG. 4 to the extent that a plurality of indicator matrices are provided, but selection operations are only effected occasionally by way of a particular matrix, then these occasional selections may be unnecessarily time-consuming by virtue of a need to step through a number of selectors. In this case, the arrangement shown in FIG. 4 can be modified in the following manner. In this modification one starts with an arrangement such as shown in FIG. 3 for series operation with merely one control switch and two selectors which, once used, can be employed again directly by a subsequent sequential actuation of the input switch. In addition to these two selectors, however, a third selector corresponding to 143 in FIG. 4, is associated with fourth selectors corresponding to 150 to 152. The linking of the outputs of these fourth selectors with servo equipment is effected in the same way as is shown in FIG. 4 by use of AND-gates with three inputs respectively associated with one fourth selector, and a fourth input similar to that from line 161 which is applied to all of these AND-gates. Since in this case, however, the third selector is not adjustable directly through an input switch, this function is performed by servo equipment operated through the two basic selectors. Thus, each position of the third selector can be attained by a respective piece of servo equipment activated by use of the one control switch. Moreover, these particular servo equipments can serve to apply a subsequent use of the control switch to effect the necessary stepping of the fourth selectors. In effect in an arrangement with a plurality of indicator matrices, a particular matrix need be selected only on requirement by two sequential actuations of a single switch, whereafter any location in that matrix can be selected by only two further sequential actuations of the control switch.

Figure 5:
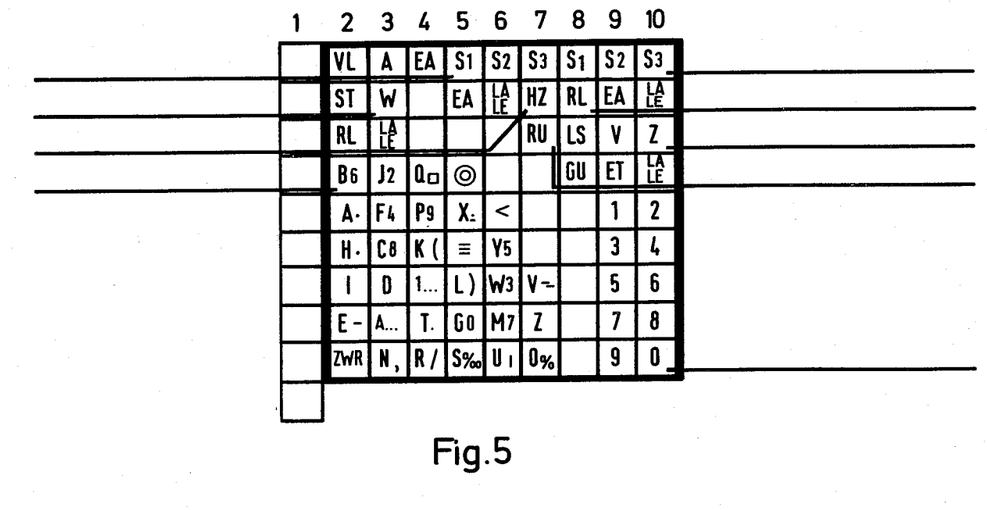
FIG. 5 shows one embodiment of an indicator matirx.

FIG. 5 shows an example for an indicator matrix in one plane. Such an indicator matrix could be used say in connection with the arrangements shown in FIG. 3 and can be used in conjunction with the arrangements shown in FIG. 4, or as one of a plurality of matrix planes. As can bee seen from FIG. 5, all the possible matrix locations to be triggered are arranged in the form of a rectangle with ten columns. Column 1 in this case forms an empty column which corresponds to the indicator 110 in FIG. 3, say. The lowest indicator of this column 1 forms the initial position into which the arrangement is reset again after a control operation has been terminated. Then the indicator runs from this initial position, with an actuation of the first selector 91, vertically upwards until the desired line is reached. Then, with actuation of the second selector 100, the desired column is triggered in this line. As can be seen from FIG. 5, a plurality of indicator locations are provided to denote the actuation of respective pieces of equipment. Thus, the numerals 0 to 1 serve to denote the selection of a telephone number, while the indicator locations lying in the top line of the matrix are associated with the individual operations for switching a television and radio on and off and also with transmission channel selection. Also, the letters of a typewriter or of a telex equipment are employed in the lower left hand region of the indicator matrix.

As can already be seen from FIG. 5, it is not uncommon for a plurality of pieces of servo equipment to be provided in order to operate a certain piece of working equipment such as a typewriter or telephone. These pieces of servo equipment can be combined to form a coherent unit which is connected as a whole to the actual control equipment and can also be interchanged in its entirety for another piece of equipment.

Figure 6A:
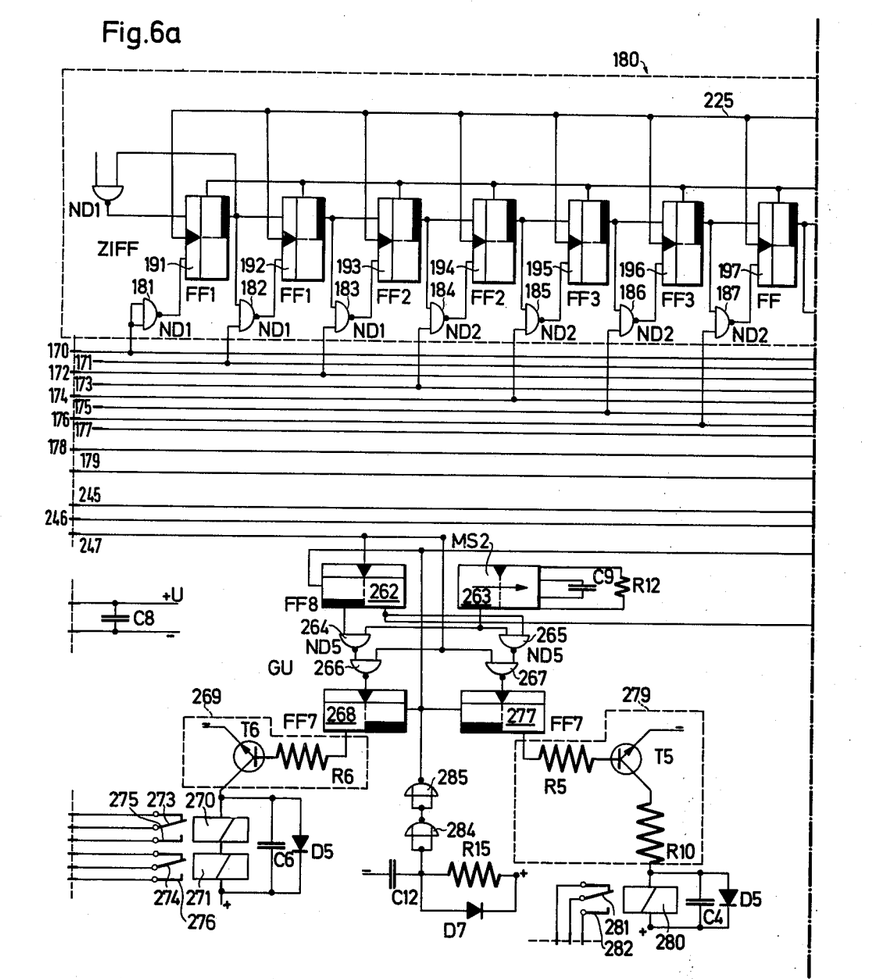
FIGS. 6a and 6b show a circuit diagram for a plurality of servo devices combined to form a telephone actuation unit.
Figure 6B:
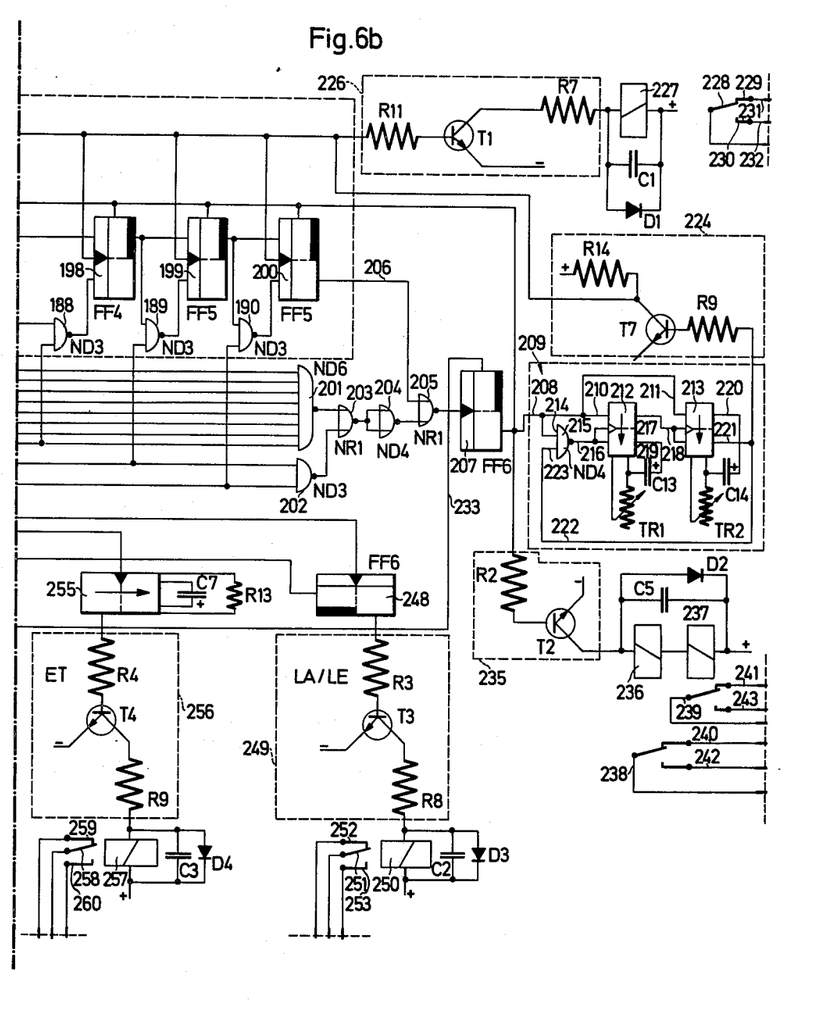

FIG. 6 shows such a coherent unit for the operation of a telephone. At least 12 separate operations have to be carried out to operate a telephone, namely, two operations corresponding to raising and lowering the receiver as well as ten operations corresponding to the dialing of the digits 0–9.

The left hand side of FIG. 6a shows plug-in contacts associated with lines 170 to 179 which can be connected to corresponding plug-in contacts at the outputs of an AND-gate such as 112 or 113 in FIG. 3, or of an AND-gate such as 159 or 160 in FIG. 4. The lines 170 to 179 form the inputs of a piece of servo equipment for the selection of one of the dialed digits 0–9. The inputs of a shift register 180, comprising inverters 181 to 190 and bistable multivibrators 191 to 200, are respectively connected to the lines 170 to 179. The lines 170 to 177 also form the inputs of an NAND-gate 201 shown in FIG. 6b, and the lines 178 and 179 form the inputs of a NAND-gate 202. The outputs of these two NAND-gates are fed to the two inputs of a NAND-gate 204 by way of an NOR-gate 203. The output of NAND-gate 204 is connected to one input of a NOR-gate 205, the other input of which is connected to the output 206 of the last stage of the shift register 180. The output of the NOR-gate 205 is connected to the input of a bistable multivibrator 207, the 2 or set output which is connected to the input 208 of a timing pulse generator 209 and also, in parallel, to all the reset inputs of the bistable multivibrators of the shift register 180. The input 208 is connected to the respective reset inputs 210 and 211 of two monostable multivibrators 212 and 213. The input 208 is also connected to an input 214 of a NOR-gate 215, the output of which is connected to the set input 216 of the multivibrator 212. The reset output 217, of this multivibrator is connected to the set input 218 of the multivibrator 213. An RC element to adjust the duration of oscillation and comprising a variable resistance TR 1 and a capacitor C13, is connected to the set output 219 of the multivibrator 212. A coreesponding variable RC element comprising a variable resistance TR2 and a capacitor C14 is connected to the reset output 220 of the monostable multivibrator 213. The set output 221 of this multivibrator is fed back to a second input 223 of the NOR-gate 215 by means of the line 222. At the same time, this set output 221 is connected to a timing line 225 of the shift register 180 by way of an amplifier 224. The output of the amplifier 224 is also connected by way of a further amplifier 226 to a relay 227, to which is connected in parallel a capacitor c1 and a diode D1. A switch-over contact 228 is actuable by the relay 227. The change-over switch 228 is capable of being switched over between contacts 229 and 230, which can be connected by means of corresponding output contacts 231 and 232 of this component to a further component or to output lines.

The set output of the multivibrator 207 is also connected to two serially connected relays 236 and 237 by way of an amplifier 235. A capacitor C5 and a diode D2 are connected in parallel to both of these relays.

The relay 236 cooperates with a switch-over contact 238, and the relay 237 with a switch-over contact 239. The switch-over contact 238 and 239 respectively cooperate with the normally closed contacts 240 or 241 and second contacts 242 or 243.

Further, lines 245 to 247 are in communication with the outputs of AND-gates of the control device, if necessary by means of corresponding adaptation or conversion devices. The line 245 is connected to the input of a bistable multivibrator 248. The set output of multivibrator 248 is connected, through an amplifier 249, with a relay 250 to which is connected in parallel a capacitor C2 and a diode D3. The relay 250 cooperates with a switch-over contact 251 which has a normally closed contact 252 and a second contact 253.

The line 246 is connected to the set input of a monostable multivibrator 255. The set output of this multivibrator is connected by way of an amplifier 256 to a relay 257 to which is connected, in parallel, a capacitor C3 and a diode D4. The relay 257 cooperates with a switch-over contact 258 with which is associated a normally closed contact 259 and a second contact 260.

The set input of a bistable multivibrator 262 and the set input of a monostable multivibrator 263 are connected to the line 247. The reset output of the bistable multivibrator 262 is connected to a first input of a NAND-gate 264, while the set output of this multivibrator is connected to a first input of a NAND-gate 265. The second inputs of the NAND-gates 264 and 265 are respectively connected to the set output of the monostable multivibrator 263. The outputs of the NAND-gate 264 and 265 are respectively connected to first inputs of NAND-gates 266 and 265. The two second inputs of these NAND-gates 266 and 267 are connected to the line 247. The output of the NAND-gate 266 is connected to the set input of a bistable multivibrator 268, the set output of which is connected by way of an amplifier 269 with two serially connected relays 270 and 271. These relays respectively cooperate with change-over switches 273 and 274, which are associated with second, normally open contacts 275 and 276. A capacitor C6 and a diode D5 are connected in parallel with the two relays 270 and 271.

The output of the NAND-gate 267 is connected to the set input of a bistable multivibrator 277. The set output of this multivibrator 277 is connected by way of an amplifier 279 to a relay 280, with which is connected in parallel a capacitor C4 and a diode D5. A switch-over contact 281, which has a normally open contact 282, is associated with the relay 280.

A serial combination of a capacitor C12 and resistor R15 is connected between negative-positive direct voltages. A diode D7 is connected in non-conducting manner parallel with the resistor R15. The two inputs of a NOR-gate 284, the output of which is connected to the two inputs of a further NOR-gate 285, are connected to the junction of the capacitor C12 and resistor R15. The output of this last NOR-gate 285 is connected to the reset inputs of the bistable multivibrator 248, 263, 268 and 277.

Lastly, the set output of the bistable multivibrator 262 is connected to the reset input of the bistable multivibrator 207 by the line 233.

This unit for actuation of a telephone operates as follows:

In the non-actuated state the lines 170 to 179 and 245 to 247 are at a high potential or '1' signal level.

When as the equipment is switched on, a continuous pulse is fed to the series connected capacitor C12 and the resistor R15, which pulse resets the multivibrators 248, 262, 268 and 277 and associated switches connect with their normally closed contacts. Now in order to begin the telephone actuation, the physically handicapped person must first select the indicator which corresponds to the operation "lift telephone receiver." When this indicator is triggered, a signal occurs at the output of the associated AND-gate in the control device. This signal causes, by means of a corresponding piece of additional equipment, switching to take place between the outputs of the AND-gate of the control equipment and the inputs of the telephone operating equipment, and a low voltage or 0 pulse to be fed to the line 247. This pulse sets the multivibrators 262 and 263 by way of its leading edge, and the multivibrators 268 and 277 by way of its terminal slope, whereby the relays 270, 271 and 280 are energized. This actuates the change-over switch 281 and effects in the telephone equipment the functions which correspond to lifting of the telephone receiver. In addition, also a speech unit with a loudspeaker can be connected by actuation of the change-over switches 273 and 274.

Also, setting of the bistable multivibrator 262 applies a signal that is fed to the reset of the bistable multivibrator 207 by way of the line 233 so that the latter multivibrator resets.

If, in a corresponding manner an appropriate indication is selected by the physically handicapped person, an 0 pulse is fed to the line 246, to actuate the relay 257 by way of the monostable multivibrator 255 so that an earthing key connected to the contacts 260 can be actuated by the change-over switch 258.

The bistable multivibrator 248 is set by a corresponding 0 pulse on the line 245, and the both outputs of this multivibrator can be associated with two loudspeaker conditions, namely "loud and soft," so that appropriate selection of the conditions of this multivibrator affords selection of the desired loudspeaker condition.

For the actual dialing of the required telephone number, the physically handicapped person must trigger appropriate indicators in the matrix which indicators correspond to the desired numeral digits. It will be assumed, for example, that the indicator for the digit "6" has been triggered by the physically handicapped person in the control device in this way. Then a 0 pulse appears on the line 174, which pulse produces a signal change at the input of the bistable multivibrator 195 from 0 to 1 by means of the NAND-gate 185.

At the same time, the NAND-gate 201, since its inputs are no longer all 1 change at its output from 0 to 1, while the output of the NAND-gate 202 remains unchanged. In this way, 0 pulse, which sets the multivibrator 207, is produced at the output of the NAND-gate 205. As a result, a 1 signal is fed to the input 208 of the timing pulse generator 209 whereby the monostable multivibrator 212 and 213 are reset. At the same time, a 0 pulse is produced at the output of the NAND-gate 215, whereby the multivibrator 212 changes state and allows the monostable multivibrator 213 to change state at the same time. The pulse occurring at the output 221 is fed back to the input 223 of the NAND-gate 215 by means of the line 222, whereby a pulse is produced at the output of this NAND-gate, to set the multivibrator 212.

The pulses obtained in this way at the output 221 are emitted by way of the amplifiers 224 and 226, the relay 227, and the change-over switch 228, as selector pulses. At the same time, these pulses are fed as timing pulses to the timing line 225 of the shift register 180. Accordingly, the signal applied to the bistable multivibrator 195 is stepped through the shift register. Finally a 1 signal is fed to the NOR-gate 205 by the sixth timing pulse through the bistable multivibrator 200, whereupon a 0 pulse results at the output of this NOR-gate, which pulse resets the multivibrator 207 into its initial position. In this way, the timing pulse generator 209 is switched off and simultaneously an 0 signal is fed to all reset inputs of the multivibrators of the shift register 180, so that they are reset into their initial state. The stepping of the shift register of course causes the desired "six" selector pulses to be emitted. While these pulses were being emitted, the bistable multivibrator 207 was operated so that at the same time a signal was simultaneously applied to the amplifier 235, and thus to the relays 236 and 237. Accordingly, a earth switch actuable by means of the change-over switch 238 and the contact 242 was actuated concurrently with the general telephone operation.

The further digits of the desired telephone number are selected in the same manner.

When the telephone conversation is terminated, or if no connection has occurred, then the indication "replace receiver" is selected by the physically handicapped person, which indication coincides in the present case with the indication "remove receiver." With this a renewed 0 pulse is fed to the line 247 whereby the multivibrator 262 is reset to its initial position. With this, the multivibrator 207 is blocked by means of the line 233. At the same time, the multivibrators 268 and 277 are reset to their initial position whereby the initial condition of the telephone is produced again.

Figure 7:
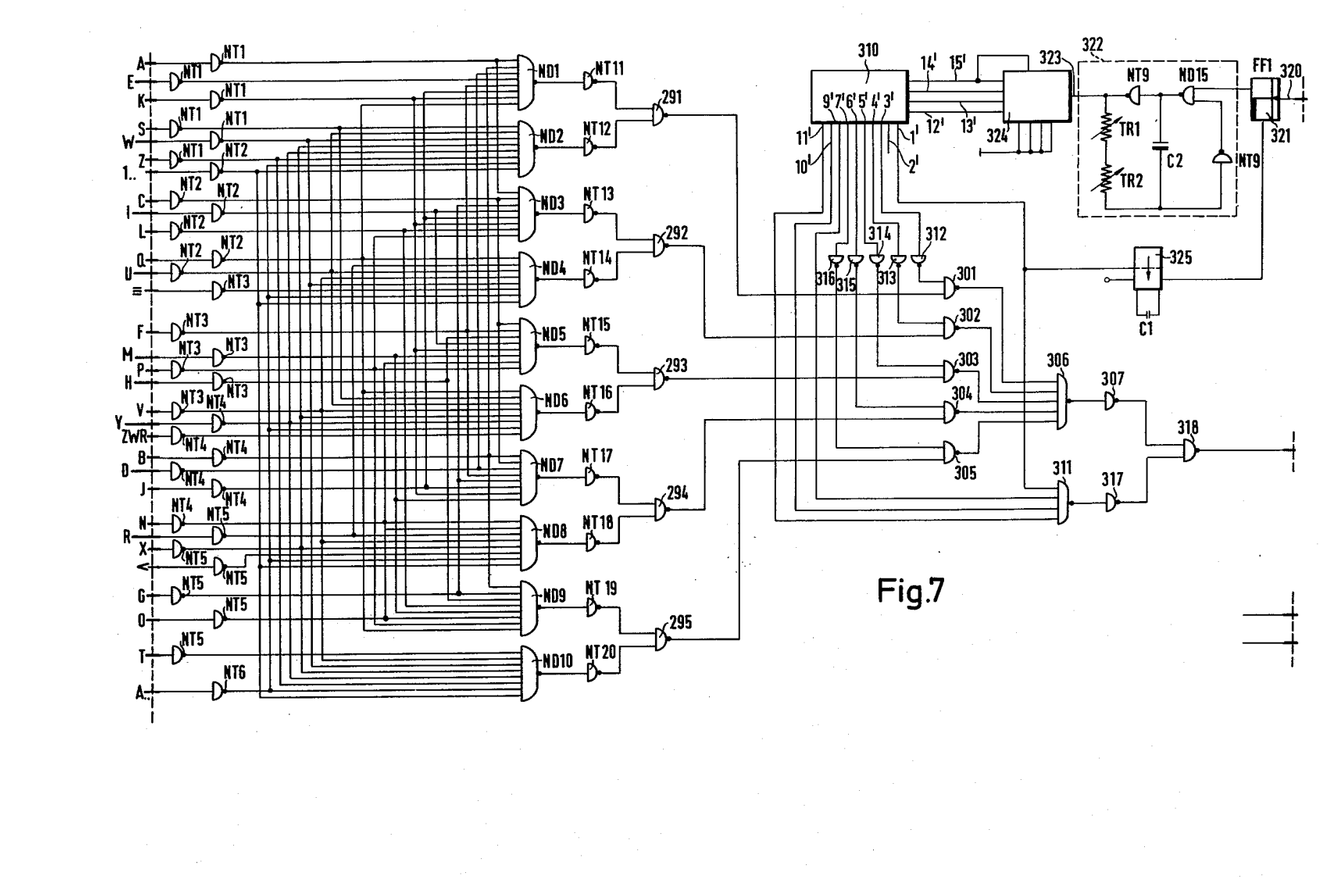
FIG. 7 shows a circuit diagram of a form of embodiment of servo devices, as a unit, for the actuation of a telex.

FIG. 7 shows a unit which combines all of the pieces of servo equipment required for a telexing operation. On the left hand edge of FIG. 7 are shown schematically a plurality of plugs which can be respectively connected to the outputs of appropriate AND-gates of the control device. This unit can be constructed, for example, in the form of a plug-in unit which can thus be connected as a whole with the control equipment and withdrawn therefrom. As already mentioned, such as unit connection or interchange only requires change of the corresponding symbol on the associated indicator. As can be seen from FIG. 7, a line is connected with each plug, with which line is associated a certain symbol of the telex keyboard, say the letters of the alphabet. In each line there is an inverter NT1, NT2, NT3, NT4, NT5, or NT6. Since there is no signal at the input lines in the normally closed state, the output of each inverter is at 1. As is well known, during telexing the individual characters are coded into a word of five binary digits. This code is standarized and was taken into account during the construction of this unit. In this unit the individual input lines are connected to corresponding inputs of ten NAND-gates ND2 to ND10, each NAND-gate having eight inputs. Respective inverters NT11 to NT20 are connected to the outputs of these NAND-gates. Successive pairs of outputs of these inverters form respective inputs of five NAND-gates 291 to 295. The outputs of these NAND-gates each form one input of respective NAND-gates 301 to 305. The outputs of these NAND-gates form the inputs of a NAND-gate 306, which has its output connected to an inverter 307.

A shift register 310 has outputs 1 to 11. The output 1 is connected to a first input of a NAND-gate 311. The output 2 is not employed. The outputs 3 to 7 are connected by means of inverters 312 to 316 to respective second inputs of the NAND-gates 301 to 305. The outputs 9 to 11 of the shift register are connected to further inputs of the NAND-gate 311. An inverter 317 is connected to the output of NAND-gate 311. The outputs of the two verters 307 and 317 form the inputs of a NAND-gate 318, at the output of which can be obtained serial pulses denoting the five binary digits of a code word.

On the right hand side of FIG. 7 is provided a connection 320 which can be connected say to the 1 output of the monostable multivibrator 47 in FIG. 2, or 120 in FIG. 3, or 167 in FIG. 4. The connection 320 is connected to the set input of a bistable multivibrator 321 the set output of which forms the input of a timing pulse generator 322. The timing pulse generator 309, shown in FIG. 6, can be used as the timing pulse generator here with advantage. The output 323 of this timing pulse generator is connected to a counter 324, the outputs of which form the four inputs 12 to 15 of the shift register 310.

The reset output of a monostable multivibrator 325 is connected to the reset input of the multivibrators 321. The set input of multivibrator 325 is connected to the output 1 of the shift register. The mode of operation of this telex character coding and translation equipment is as follows:

In the starting state 1 input signals are applied to all inputs of the NAND-gates ND1 to ND10. Now if, for example, the letter "M" is triggered by the physically handicapped person with the help of the control equipment, a signal is produced at the output of the AND-gate associated with this letter in the control equipment, which signal is fed to the corresponding input line with the index M in the present unit. In this way, a 0 signal is fed by means of the corresponding inverter NT3 in this line to one input of each of the NAND-gates ND5, ND7 and ND9, whereby the output of these NAND-gates changes from 0 to 1. In this way, a 1 signal is produced at the output of each of NAND-gates 293, 294 and 295 while a 0 is also applied to the output of the NAND-gates 291 and 292. Thus, the letter M is obtained at the outputs of the NAND-gates 291 and 295 in relevant binary code in parallel form, namely as 0-0-1-1-1.

An 0 pulse by which the multivibrator 321 is set appears at the connection 320 corresponding to the specified circuit at the end of the control operation executed by the physically handicapped person, because it is not blocked. Thus, at the input of the timing pulse generator 322 there is a 1 pulse which sets the timing generator in operation. The pulses obtained by this are ed to the shift register 310 by means of the counter 324. At the beginning of the interrrogation process the output 1 of the shift register is at 0, while all the other outputs are at 1. Thus, an 0 signal is applied, through the inverters 312 to 316, to one input of each of the NAND-gates 301 to 305, so that all the outputs of all these NAND-gates are at 1. In this way the output of the NAND-gates 306 is at 0. On the other hand, the output of the NAND-gates 311 is at 1, so that as a result a 1 signal is at the output of the NAND-gate 318.

Now, if the first counting pulse if fed to the shift register 310, then 0 signal is shifted in the shift register to the output 2. This only changes the output of the NAND-gate 311 so that a 0 output is produced by the NAND-gate 318. Now, if a further counting pulse is fed to the shift register 310, the 0 signal is shifted to the output 3 in the shift register. This changes the output of the inverter 312 to a 1 signal whereby, together with the 0 output at the NAND-gate 291, the output 1 is retained at the NAND-gate 301. The output of the NAND-gate 318 thus still remains at 0. The same applies then if the 0 signal is shifted into the position 4 in the shift register 310, since there is 0 signal at the output of the NAND-gate 292. Only if the 0 signal is displaced to the output 5 in the shift register, then because of the 1 signal at the output of the NAND-gate 293, the output of the NAND-gate 306 is changed, whereby a 1 signal is produced at the output of the NAND-gate 318. The same result is obtained by displacement through the outputs 6 and 7 of the shift register, sicne in each case a 1 signal is applied to the outputs of the NAND-gates 294 and 295. Thus the code initially obtained in paralled form is now produced in serial form at the output of the NAND-gate 318.

The usual separating signal between two code sequences is obtained by displacement through the outputs 9 to 11 of the shift register.

Then the 0 signal in the shift register is shifted from the output 11 to the starting position 1 by a final counting pulse, whereby as set signal is fed to the monostable multivibrator 325, and the bistable multivibrator 321 is reset so that the timing pulse generator is switched off.

In conclusion, it is to be noted that the control equipment can be used with any type of servo equipment, without special adaptation of the control equipment having ot be undertaken. The signal conversion for each individual operation to be executed can take place in the control equipment. The output channels of the control equipment can be combined in any way whatever, since they are the same in their mode of operation. In this way, corresponding pieces of servo equipment can be connected with any otuput channels whatever. preferably, the pieces of servo equipment are combined in each case to form function groups and arranged on separate printed circuit boards, which are normally easily interchangeable. The conversion of the switch functions supplied by the control equipment into operations, say, in the form of producing a telex code, takes place only in the pieces of servo equipment when a predetermined operation is effected thereby. The pieces of servo equipment are suited to control equipment such as a light switch, a telephone, telex, radio and so on, and they thus afford simple adaptation. The control equipment can, of course, be generally applicable to a variety of servo equipments. Also, it will be appreciated that analog operations as well as other forms of operation also can be executed from the start and end of a controlled procedure.

What is claimed is:

1. Control apparatus for use by seriously physically handicapped persons comprising a single input switch means operable by a handicapped person for selected actuation periods determined by the handicapped person; stepping pulse generator means connectable with said input switch means for operation in response thereto to produce stepping pulses during the selected actuation intervals; at least first and second selector means connectable to said stepping pulse generator means and responsive to said input switch means for operation in response to the stepping pulses produced during selected actuation periods of said input switch means, said at least first and second selector means having a plurality of outputs producing individual signals respectively representing certain conditions or operations to be performed; a first control device responsive to the input switch means and operable to produce a control signal in response to termination of the actuation period of the apparatus; at least first and second sets of logic gates, there being a set of logic gates for each selector means, each of said logic gates having a first set of inputs connected with respective outputs of said first and second selector means and a second set of inputs connected in common with the output from said first control device, said logic gates being operable in response to simultaneous occurrence of the respective first and second selector means output signals and said control signal; a plurality of output devices respectively connected to the outputs from the logic gates for carrying out selected operations or representing selected conditions; additional logic gate means having at least first an second inputs with the first inputs connected to the output from the stepping pulse generator means and the second inputs connected to be responsive to the input switch means, the outputs from the additional logic gate means being connected to control respectively said first and second selector means, and a selector means switching device connected to and controlled by said single input switch means and having the output thereof connectable to the second inputs of the additional logic gate means for supplying control enabling signals thereto in response to actuation of the single input switch means whereby the first selector means can be selectively actuated and thereafter the second selector means selectively actuated in sequence to selectively operate an output device through selective operation of only the single input switch means.

2. Control apparatus according to claim 1, wherein the selector means switching device comprises a first bistable switch device connected between the single input switch means and the second inputs of the additional logic gate means for applying stepping pulses to said first selector means during one stable state of said first bistable switch device and for applying stepping pulses to said second selector means during the other stable state of said first bistable switch device.

3. Control apparatus according to claim 2, further including feedback bistable switch means having the input thereof connected to and controlled by said first control device and having the output thereof selectively connectable by means of said first bistable switch device for enabling said stepping pulse generator means to supply stepping pulses to said first and second selector means through said additional logic gate means following each complete selection operation of the single input switch means whereby the selector means are caused automatically to step around to a quiescent initial reference position following each complete cycle of operation of the control apparatus.

4. Control apparatus according to claim 1, wherein the selector means switching device comprises a third selector means serially connected intermediate the single input switch means and the inputs of said at least first and second selector means for selectively connecting the inputs of said at least first and second selector means, respectively, to the single input switch means.

5. Control apparatus according to claim 4, further including feedback bistable switch means having the input thereof connected to and controlled by said first control device, and feedback logic gate means for supplying and enabling output signal from said feedback bistable switch means to said third selector means and to each of said at least first and second selector means and said stepping pulse generator means following each complete selection operation of the single input switch means whereby the selector means are caused automatically to step around to an initial quiescent reference position following each complete cycle of operation of the control apparatus.

6. control apparatus for use by seriously physically handicapped persons, which apparatus comprises first input switch means operable by a handicapped person for an actuation period determined by that person; a stepping pulse generator connected with said first input switch means for operation in response thereto to produce stepping pulses during said actuation period; first selector means operable in stepped manner through a plurality of different conditions connected to said stepping pulse generator and to said first input switch means for operation in response to pulses produced during actuation of said first input switch means, said first selector means having a plurality of outputs producing individual signals respectively representing said conditions when extant; a first control device responsive to said input switch means and operable to produce a control signal in response to termination of the actuation period of said apparatus, a plurality of logic gates each having one set of inputs respectively connected with said selector outputs and a second set of inputs connected in common with said first control device, each of said logic gates being operable in response to simultaneous occurrence of the respective ones of said first selector means output signals and said control signal; a plurality of servo devices respectively connected with said logic gates for actuation in response to operation of the respective logic gates; second input switch means operable by a handicapped person for an actuation period determined thereby and connected with said stepping pulse generator for selectively operating the same, second selector means operable in stepped manner through a plurality of different conditions and connected to said second input switch means and said pulse generator for operation in response to said pulses during actuation of said second input switch means, and having a plurality of outputs producing individual signals respectively representing such different conditions when extant; said first control device being responsive to both said first and second input switch means and operable to produce said control signal only in response to termination of the actuation periods of both said first and second input switch means; said logic gates being respectively connected with individually different pairs of one of said first selector means otuputs and one of said second selector means outputs and with said control device, for operation in response to simultaneous occurrence of the respective pair of said selector output signals and control signal; first and second additional logic gate means each having the inputs thereof connected with said pulse generator and respectively connected with said first and second input switch means, and having the outputs respectively connected with said first and second selector means for applying said pulses to said first and second selector means in respective association with actuation periods of said first and second input switch means; third input switch means operable by a handicapped person for an actuation period determined by that person and connected with said pulse generator to operate the same; a first bistable switch device connected between said third input switch means and said second logic gates to apply said stepping pulses to said first selector means during one stable state of said first bistable switch device and to said second selector means during the other stable state of said first bistable switch device; and a second bistable switch device comprising switchover means connected between each of said input switch means, on the one hand, and said first and second additional logic gate means and said pulse generator, on the other hand, for disconnecting said first and second input switch means and for connecting said third input switch means to said first and second additional logic gates, respectively, during different stable states of said second bistable switch device.

7. apparatus according to claim 6, further comprising a plurality of indicators connected with individually different pairs of one of said first selector outputs and one of said second selector outputs.

8. Control apparatus for use by seriously physically handicapped persons, which apparatus comprises first input switch means operable by a handicapped person for an actuation period determined by that person; a stepping pulse generator connected with said first input switch means for operation in response thereto to produce steppinng pulses during said actuation period; first selector means operable in stepped manner through a plurality of different conditions connected to said stepping pulse generator and to said first input switch means for operation in response to pulses produced during actuation of said first input switch means, said first selector means having a plurality of outputs producing individual signals respectively representing said conditions when extant; a first control device responsive to said input switch means and operable to produce a control signal in response to termination of the actuation period of said apparatus, a plurality of logic gates each having one set of inputs respectively connected with said selector outputs and a second set of inputs connected in common with said first control device, each of said logic gates being operable in response to simultaneous occurrence of the respective ones of said first selector means output signals and said control signal; a plurality of servo devices respectively connected with said logic gates for actuation in response to operation of the respective logic gates; and a selector reset device operably connected with said first selector means to reset the same to a predetermined one of said conditions, and connected with said control device for operation thereby in response to said cntrol signal.

9. Apparatus according to claim 8, wherein said selector reset device is operably connected with said pulse generator to produce said pulses and step said first selector means to said predetermined condition and is operably actuated by said control device independently of said gates and said logic gates are rendered inoperable during said reset stepping.

10. Apparatus according to claim 8 wherein said selector reset device is connected with the one of said selector outputs corresponding to said predetermined condition for response to the relevant selector output signal to render said reset device inoperable.

11. Control apparatus for use by seriously physically handicapped persons, which apparatus comprises first input switch means operable by a handicapped person for an actuation period determined by that person; a stepping pulse generator connected with said first input switch means for operation in response thereto to produce stepping pulses during said actuation period; first selector means operable in stepped manner through a plurality of different conditions connected to said stepping pulse generator and to said first input switch means for operation in response to pulses produced during actuation of said first input switch means, said first selector means having a plurality of outputs producing individual signals respectively representing said conditions when extant; a first control device responsive to said input switch means and operable to produce a control signal in response to termination of the actuation period of said apparatus, a plurality of logic gates each having one set of inputs respectively connected with said selector outputs and a second set of inputs connected in common with said first control device, each of said logic gates being operable in response to simultaneous occurrence of the respective ones of said first selector means output signals and said control signal; a plurality of servo devices respectively connected with said logic gates for actuation in response to operation of the respective logic gates, second selector means operable in stepped manner through a plurality of different conditions connected to said input means for operation in response to successive actuations thereof, and having a plurality of outputs producing individual signals respectively representing said conditions when extant; a plurality of second logic gates respectively connected with a different one of said second selector means outputs, and each connected with said pulse generator; and a plurality of third and fourth selector means each equivalent to said first selector means, and each connected to a respectively different one of said second logic gates for operation in response to said pulses and the respective second selector means output signal; and wherein said control device is operable to produce said control signal only in response to termination of all of said successive actuations of said input means; and said first mentioned logic gates are respectively connected with individually different combinations of said first, third and fourth selector means outputs taken one each from all of said first, third and fourth selector means, and are each connected with said control device for operation in response to simultaneous occurrence of the respective combination of all three output signals and said control signal; a selector reset device; each of said first, third and fourth selector means having a predetermined starting condition and a corresponding output for producing a signal when such condition is extant; said selector reset device being connected to said control device for operation thereby in response to said control signal; said reset device being connected with said pulse generator and each of said second logic gates to operate the same and reset each of said first, third and fourth selector means by stepping in unison to their respective starting condition; and further comprising a third logic gate connected with each of said first, third and fourth selector means starting condition outputs to render such gate operative in response to simultaneous occurrence of signals from all such outputs, and operably connected with said reset device to render the latter inoperative.

12. Apparatus according to claim 11 wherein said selector reset device is further operably connected with said second selector means to step the same.

* * * * *